United States Patent
Notsu

(10) Patent No.: US 10,864,803 B2
(45) Date of Patent: Dec. 15, 2020

(54) GLASS PLATE, LAMINATED GLASS, AND WINDSHIELD

(71) Applicant: AGC Inc., Chiyoda-ku (JP)

(72) Inventor: Keiji Notsu, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/428,037

(22) Filed: May 31, 2019

(65) Prior Publication Data

US 2019/0283550 A1    Sep. 19, 2019

Related U.S. Application Data

(63) Continuation of application No. PCT/JP2017/043134, filed on Nov. 30, 2017.

(30) Foreign Application Priority Data

Dec. 2, 2016  (JP) .................. 2016-235219

(51) Int. Cl.
*B32B 7/02* (2019.01)
*B60J 1/02* (2006.01)
(Continued)

(52) U.S. Cl.
CPC .............. *B60J 1/02* (2013.01); *B32B 3/263* (2013.01); *B32B 17/10036* (2013.01);
(Continued)

(58) Field of Classification Search
CPC ........ B32B 17/10036; B32B 17/10761; B32B 2250/03; B32B 2250/40; B32B 2605/006; B32B 3/263; B60J 1/00; B60J 1/02
See application file for complete search history.

(56) References Cited

U.S. PATENT DOCUMENTS

| 5,812,332 A | 9/1998 | Freeman |
| 2001/0044010 A1 | 11/2001 | Freeman |

(Continued)

FOREIGN PATENT DOCUMENTS

| JP | 7-195959 | 8/1995 |
| JP | 2002-154321 | 5/2002 |

(Continued)

OTHER PUBLICATIONS

International Search Report dated Feb. 6, 2018 in PCT/JP2017/043134 filed Nov. 30, 2017 (with English Translation).

(Continued)

*Primary Examiner* — Lawrence D Ferguson
(74) *Attorney, Agent, or Firm* — Oblon, McClelland, Maier & Neustadt, L.L.P.

(57) ABSTRACT

This glass plate has: a first main surface and a second main surface; and a first end surface and a second end surface that abut on the first main surface and the second main surface, respectively, wherein the glass plate has a wedge-shaped cross-sectional shape in which the thickness on the first end surface side is less than that on the second end surface side. The glass plate has: a first chamfered section which includes a first apical end having a curved surface shape at the first end surface; and a second chamfered section which includes a second apical end having a curved surface shape at the second end surface, and the first apical end and the second apical end are formed in the same shape.

20 Claims, 8 Drawing Sheets

(51) Int. Cl.
*B32B 3/26* (2006.01)
*B32B 17/10* (2006.01)
*B60J 1/00* (2006.01)

(52) U.S. Cl.
CPC .... *B32B 17/10761* (2013.01); *B32B 2250/03* (2013.01); *B32B 2250/40* (2013.01); *B32B 2605/006* (2013.01); *B60J 1/00* (2013.01)

(56) References Cited

U.S. PATENT DOCUMENTS

| | | |
|---|---|---|
| 2002/0008926 A1 | 1/2002 | Freeman |
| 2003/0215610 A1 | 11/2003 | Digiampaolo et al. |
| 2004/0109251 A1 | 6/2004 | Freeman |
| 2005/0158520 A1 | 7/2005 | Freeman |
| 2017/0050415 A1 | 2/2017 | Kanki et al. |
| 2017/0334759 A1 | 11/2017 | Yamato et al. |

FOREIGN PATENT DOCUMENTS

| | | |
|---|---|---|
| JP | 2015-168599 | 9/2015 |
| WO | WO 03/086996 A1 | 10/2003 |
| WO | WO 2016/117650 A1 | 7/2016 |

OTHER PUBLICATIONS

Written Opinion dated Feb. 6, 2018 in PCT/JP2017/043134 filed Nov. 30, 2017.

[FIG. 1]
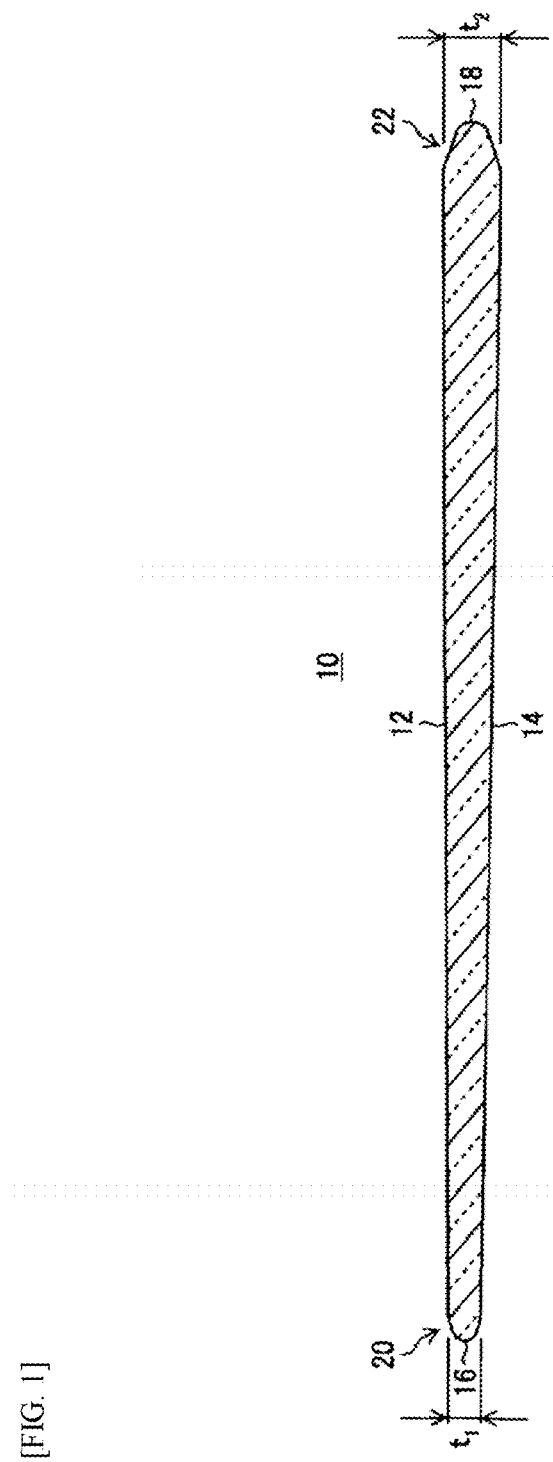

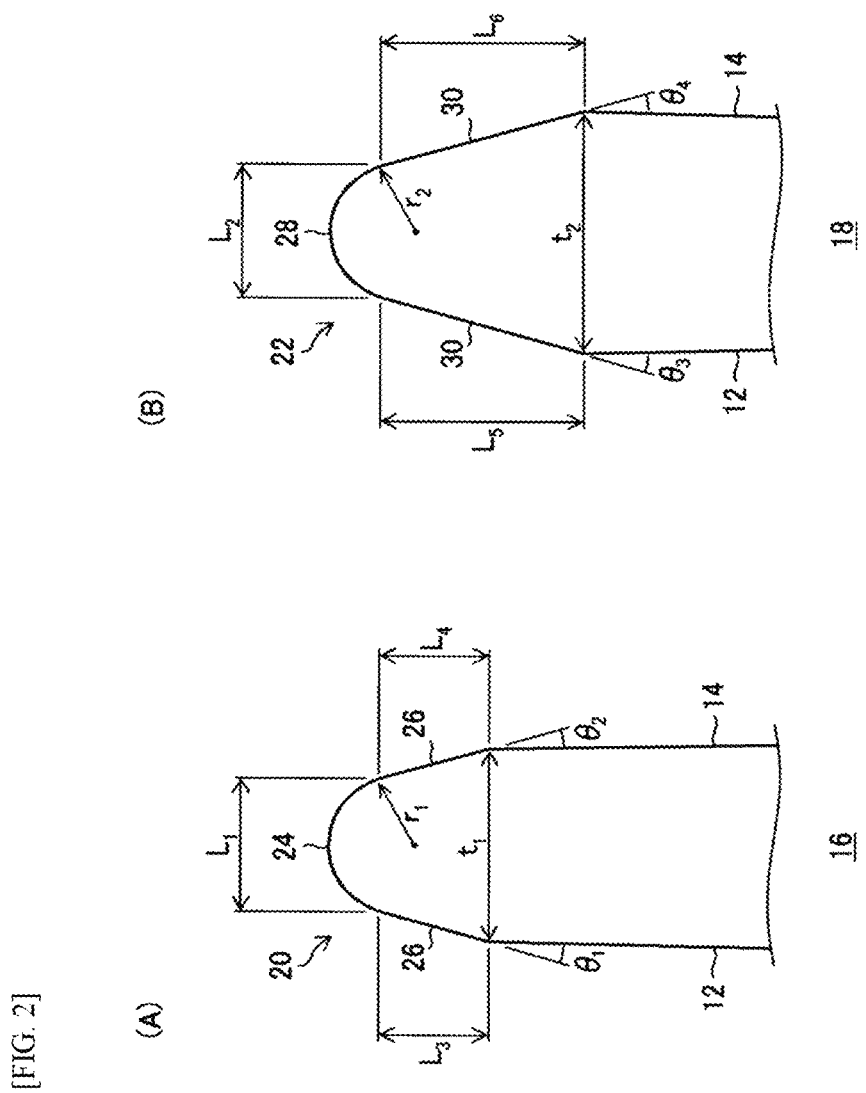
[FIG. 2]

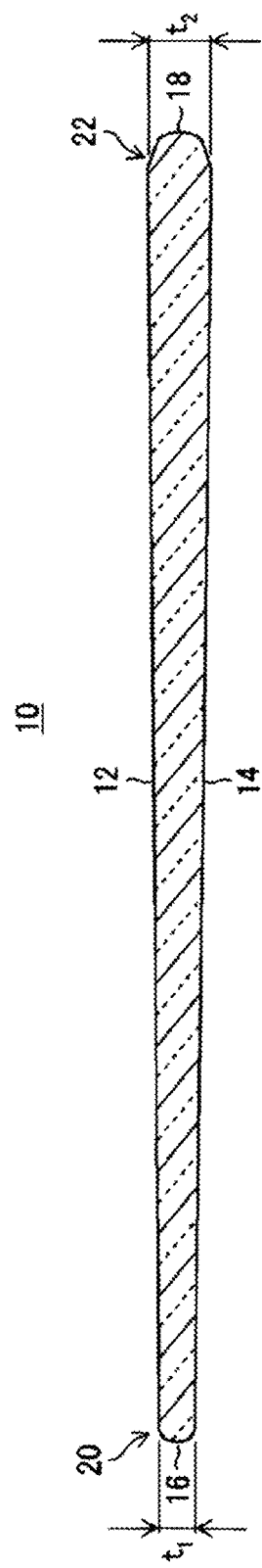

[FIG. 4]
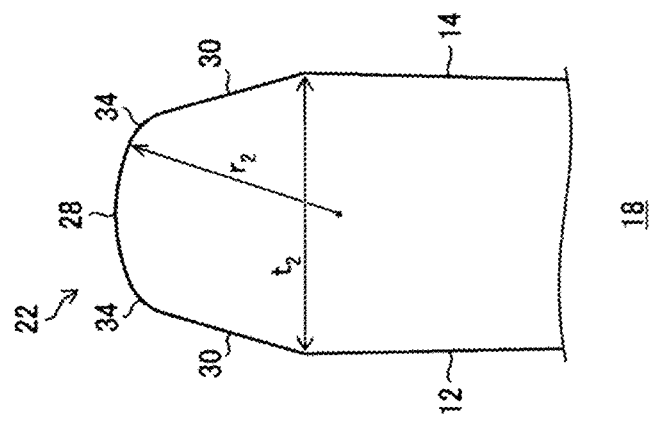
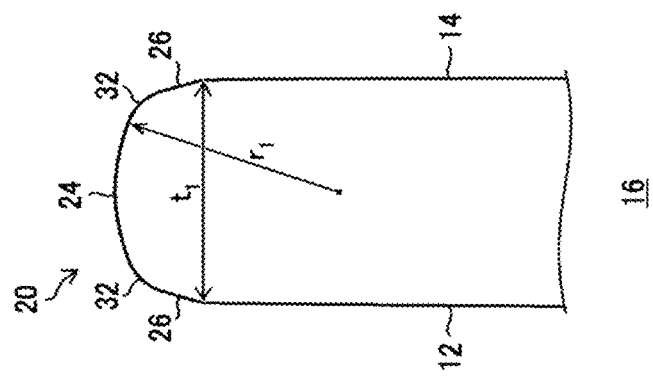

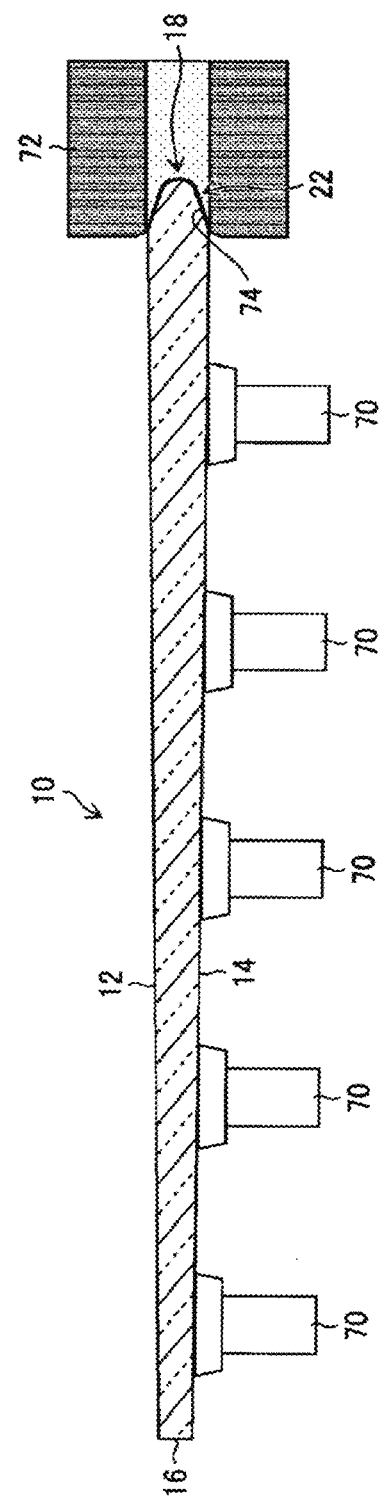

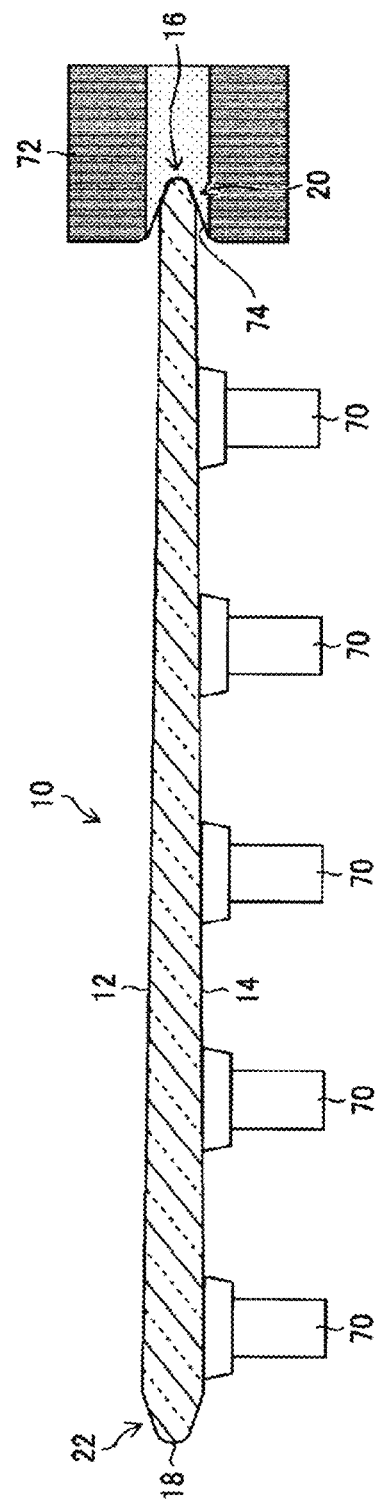
[FIG. 6]

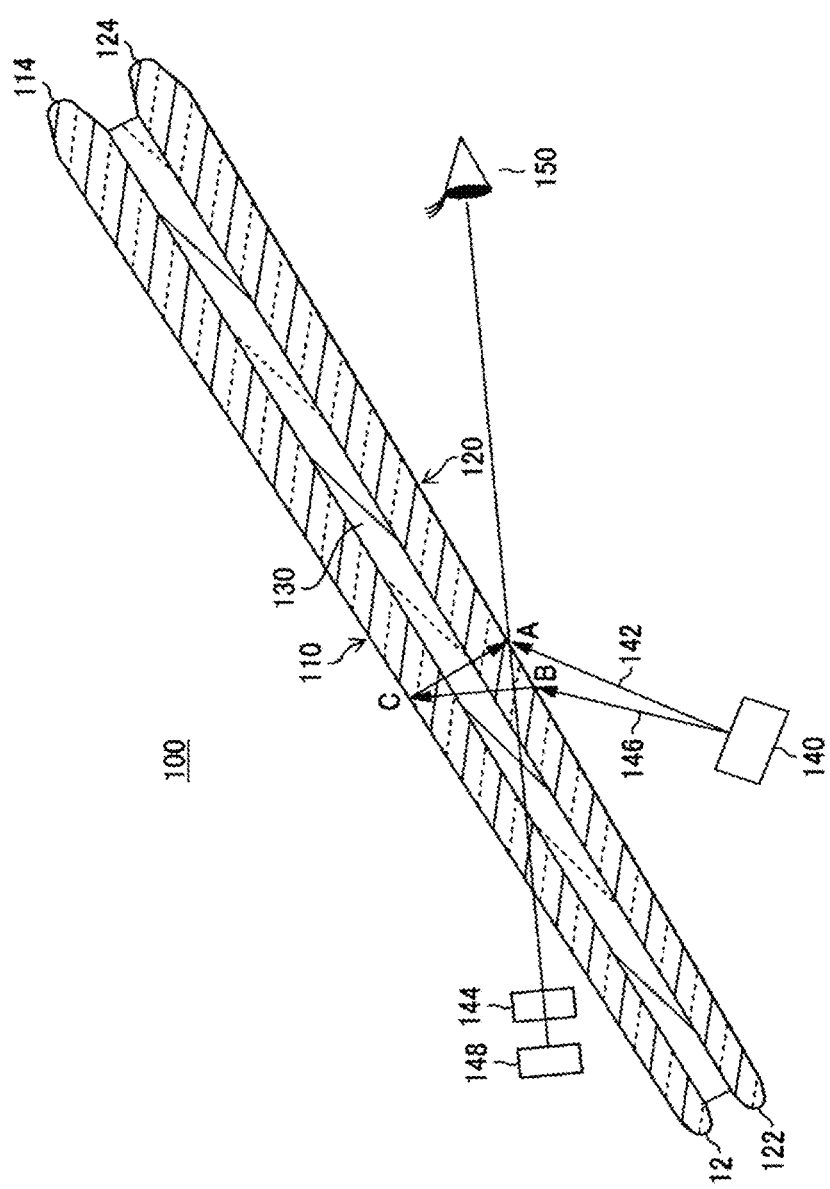

[FIG. 8]
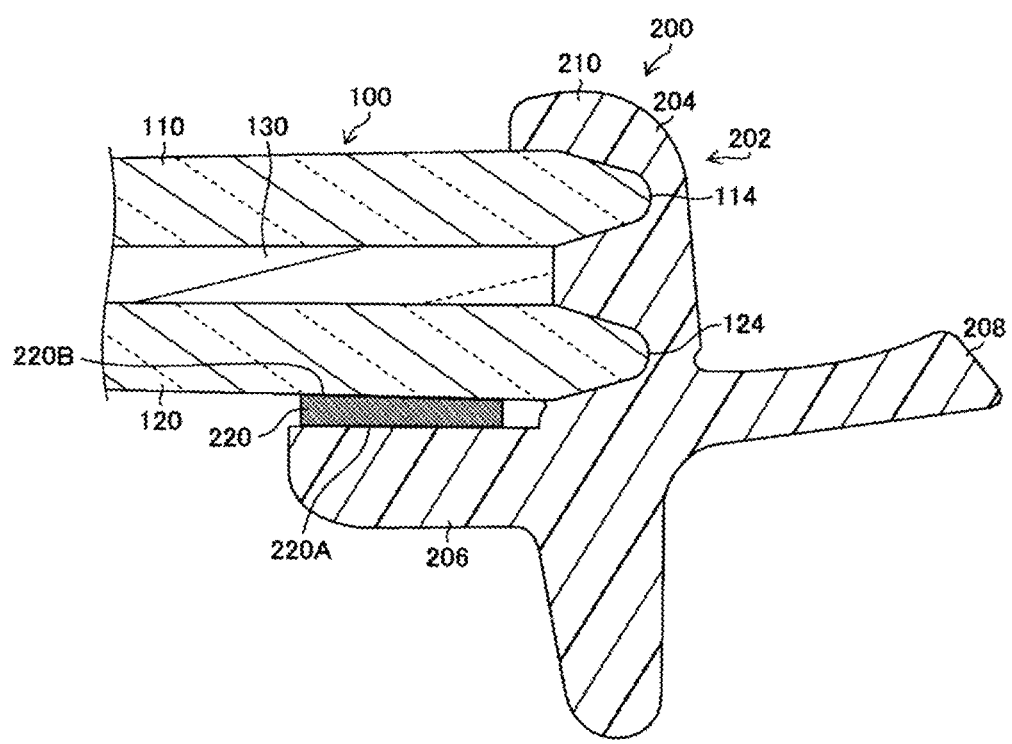

GLASS PLATE, LAMINATED GLASS, AND WINDSHIELD

TECHNICAL FIELD

The present invention relates to a glass plate, a laminated glass, and a windshield.

BACKGROUND ART

A glass plate is applied to a window of a vehicle such as a car. A chamfered portion is generally formed in an end surface of the glass plate in order to suppress occurrence of a defect such as chipping. In the case where the glass plate is used as a windshield, a laminated glass is used because broken pieces of the laminated glass can be prevented from easily scattering even if the laminated glass is broken, and an object flying from the front during traveling of the vehicle can be prevented from easily penetrating the laminated glass. Patent Literature 1 discloses a laminated glass in which two glass plates with chamfered portions are bonded to each other through an intermediate film.

In recent years, a head-up display (hereinafter referred to as HUD) is used as a method for displaying information for a driver of a vehicle such as a car. In the HUD, various kinds of information are displayed on a windshield. However, there is a disadvantage that when a laminated glass in which two glass plates are disposed in parallel is used as the windshield, an image displayed on the laminated glass is viewed as a double image.

Patent Literature 2 discloses a use of glasses each having a wedge shape in a sectional shape for a laminated glass in order to reduce the amount of double images.

PRIOR ART DOCUMENT

Patent Literature

[Patent Literature 1] JP-A-2002-154321
[Patent Literature 2] JP-A-H07-195959

SUMMARY OF THE INVENTION

Problems that the Invention is to Solve

As described above, a chamfered portion is formed in an end surface of a glass plate. The chamfered portion typically has a shape corresponding to the plate thickness thereof. When the glass plate has a wedge shape in a sectional shape, the plate thickness has a variation in its end surfaces. In this manner, for a single glass plate, when shapes of a chamfered portion in an end surface which is thick in the plate thickness and a chamfered portion in an end surface which is thin in the plate thickness are formed into different shapes corresponding to the plate thicknesses, a plurality of chamfering steps using grindstones corresponding to the shapes are required. Thus, there is a problem of poor productivity. Further, there is another problem that variation of the chamfering quality easily occur.

The present invention has been developed in consideration of such problems. An object of the present invention is to provide a glass plate, a laminated glass and a windshield, which have a chamfered portion excellent in productivity and stability of chamfering quality.

Means for Solving the Problems

A glass plate according to the present invention includes: a first main surface and a second main surface; and a first end surface and a second end surface that are adjacent to the first main surface and the second main surface, the glass plate having a wedge shape in a sectional shape in which a thickness on a first end surface side is thinner than a thickness on a second end surface side, in which: the first end surface includes a first chamfered portion including a first tip portion having a curved surface shape; the second end surface includes a second chamfered portion including a second tip portion having the curved surface shape; and the first tip portion and the second tip portion have the same shape.

A laminated glass according to the present invention includes two or more glass plates that are bonded to each other through an intermediate film, in which at least one of the glass plates is the aforementioned glass plate.

A windshield according to the present invention includes the aforementioned laminated glass, and a resin frame that is attached to a peripheral edge portion of the laminated glass.

Advantageous Effects of the Invention

According to the present invention, it is possible to obtain a glass plate, a laminated glass and a windshield, which have a chamfered portion excellent in productivity and stability of chamfering quality.

BRIEF DESCRIPTION OF DRAWINGS

FIG. 1 is a sectional view of a glass plate according to a first embodiment.

(A) of FIG. 2 is an enlarged view of a first end surface in FIG. 1, and (B) of FIG. 2 is an enlarged view of a second end surface in FIG. 1.

FIG. 3 is a sectional view of a glass plate according to a second embodiment.

(A) of FIG. 4 is an enlarged view of a first end surface in FIG. 3, and (B) of FIG. 4 is an enlarged view of a second end surface in FIG. 3.

FIG. 5 is an explanation drawing in which the second end surface of the glass plate is chamfered by a rotary grindstone.

FIG. 6 is an explanation drawing in which the first end surface of the glass plate is chamfered by the rotary grindstone.

FIG. 7 is a sectional view showing an example of a laminated glass.

FIG. 8 is a sectional view of a main portion of a windshield.

MODE FOR CARRYING OUT THE INVENTION

Embodiments of the present invention will be described below with reference to the accompanying drawings. The present invention will be described along the following embodiments. However, the present invention can be changed by various manners without departing from the scope thereof, and other embodiments than the present embodiments may be used. Accordingly, all the changes within the scope of the present invention are included in the present application. Here, parts designated by one and the same sign in the drawings are basically similar elements with similar functions.

(Glass Plate)

A glass plate according to a first embodiment will be described with reference to FIG. 1 and FIG. 2. FIG. 1 is a sectional view of the glass plate according to the first embodiment. FIG. 2 is enlarged views of end surfaces of the glass plate in FIG. 1.

As shown in FIG. 1, a glass plate 10 has a first main surface 12 and a second main surface 14, and a first end surface 16 and a second end surface 18 that are adjacent to the first main surface 12 and the second main surface 14. The glass plate 10 has a wedge shape in a sectional shape in which thickness $t_1$ on the first end surface 16 side is thinner than thickness $t_2$ on the second end surface 18 side. The wedge shape means a shape whose thickness varies gradually (to be thicker or thinner) from one end side toward the other end side. The glass plate according to the first embodiment is a glass plate in which a first tip portion and a second tip portion which will be described later each have curvature radius being not larger than ½ of the thickness $t_1$.

The thickness $t_1$ is preferably 0.5 mm or more and 2.35 mm or less, more preferably 1.0 mm or more and 2.3 mm or less, further more preferably 1.6 mm or more and 2.3 mm or less, and particularly preferably 1.8 mm or more and 2.1 mm or less. The thickness $t_2$ is preferably 0.6 mm or more and 3.35 mm or less, more preferably 1.1 mm or more and 3.3 mm or less, further more preferably 1.7 mm or more and 3.3 mm or less, and particularly preferably 1.9 mm or more and 3.1 mm or less. The thickness $t_1$ and the thickness $t_2$ of the glass plate 10 can be measured by a thickness gauge or the like.

A wedge angle in the sectional shape of the glass plate 10 is preferably 0.1 mrad or more and 0.7 mrad or less, more preferably 0.2 mrad or more and 0.6 mrad or less, and further more preferably 0.3 mrad or more and 0.6 mrad or less. The wedge angle can be calculated as an average value from the glass as a whole.

In addition, the glass plate 10 may include a part with a wedge angle of zero, that is, a flat part on the way from the first end surface 16 to the second end surface 18. Further, the wedge angle does not have to be constant but may have a variation.

In the glass plate 10, a first chamfered portion 20 is provided in the first end surface 16, and a second chamfered portion 22 is provided in the second end surface 18. In the case where the first chamfered portion 20 and the second chamfered portion 22 are provided, occurrence of a defect such as chipping can be suppressed, and damages such as flaws caused by cutting or the like can be eliminated.

In the glass plate 10 according to the first embodiment, the tip portion of the first chamfered portion 20 in the first end surface 16 at a side of thin plate thickness has the same shape as that of the second chamfered portion 22 in the second end surface 18 having thick plate thickness. Thus, the productivity of the glass plate 10 can be improved. In addition, the first chamfered portion 20 and the second chamfered portion 22 can be processed with one and the same grindstone without requiring a troublesome process. Thus, chamfering quality can be stabilized.

(A) of FIG. 2 is an enlarged view of the first end surface. The first chamfered portion 20 in the first end surface 16 has a first tip portion 24 having a curved surface shape, and two first outside portions 26 provided between the first main surface 12 and the first tip portion 24 and between the second main surface 14 and the first tip portion 24 so as to connect the first tip portion 24 to the first main surface 12 and the second main surface 14 respectively.

The first tip portion 24 has an arc shape, whose curvature radius $r_1$ is not larger than ½ of the thickness $t_1$. Thus, the boundary portion between the chamfered portion and the non-chamfered portion can be processed easily to stabilize the quality. Each of the two first outside portions 26 has a flat shape or a curved surface shape. The two first outside portions 26 expand gradually like a tapered shape from the first tip portion 24 toward the first main surface 12 and the second main surface 14. The flat shape is a linear shape or a substantially linear shape in sectional view. The curved surface shape is a shape which has a comparatively large curvature radius and is close to a substantially linear shape.

(B) of FIG. 2 is an enlarged view of the second end surface. The second chamfered portion 22 in the second end surface 18 has a second tip portion 28 having a curved surface shape, and two second outside portions 30 provided between the first main surface 12 and the second tip portion 28 and between the second main surface 14 and the second tip portion 28 so as to connect the second tip portion 28 to the first main surface 12 and the second main surface 14 respectively.

The second tip portion 28 has an arc shape, whose curvature radius $r_2$ is not larger than ½ of the thickness $t_1$. Thus, the boundary portion between the chamfered portion and the non-chamfered portion can be processed easily to stabilize the quality. Each of the two second outside portions 30 has a flat shape or a curved surface shape. The two second outside portions 30 expand gradually like a tapered shape from the second tip portion 28 toward the first main surface 12 and the second main surface 14. The flat shape is a linear shape or a substantially linear shape in sectional view. The curved surface shape is a shape which has a comparatively large curvature radius and is close to a substantially linear shape.

The shape of the first tip portion 24 will be compared with the shape of the second tip portion 28. The curvature radius $r_1$ of the first tip portion 24 is equal to the curvature radius $r_2$ of the second tip portion 28, and length $L_1$ of the first tip portion 24 is equal to length $L_2$ of the second tip portion 28. The shape of the first tip portion 24 is the same as the shape of the second tip portion 28.

Examples of the arc shape of the first tip portion 24 and the second tip portion 28 include an arc of a perfect circle and an arc of an ellipse. Although the case of an arc shape has been described above, the shape is not limited to the arc shape as long as it is a curved surface shape.

The shape of each first outside portion 26 will be compared with the shape of each second outside portion 30. When the first outside portions 26 and the second outside portions 30 have flat shapes, an inclination angle $\theta_1$ formed between the first outside portion 26 and the first main surface 12 is equal to an inclination angle $\theta_3$ formed between the second outside portion 30 and the first main surface 12. In addition, an inclination angle $\theta_2$ formed between the first outside portion 26 and the second main surface 14 is equal to an inclination angle $\theta_4$ formed between the second outside portion 30 and the second main surface 14.

When the first outside portions 26 and the second outside portions 30 have curved surface shapes, the inclination angle $\theta_1$ formed between the first main surface 12 and a straight line in contact with the first outside portion 26 at an intersection between the first main surface 12 and the first outside portion 26 is equal to the inclination angle $\theta_3$ formed between the first main surface 12 and a straight line in contact with the second outside portion 30 at an intersection between the first main surface 12 and the second outside portion 30. In addition, the inclination angle $\theta_2$ formed between the second main surface 14 and a straight line in contact with the first outside portion 26 at an intersection between the second main surface 14 and the first outside portion 26 is equal to the inclination angle $\theta_4$ formed between the second main surface 14 and a straight line in contact with the second outside portion 30 at an intersection between the second main surface 14 and the second outside portion 30.

On the other hand, length $L_3$ of the first outside portion 26 on the first main surface 12 side is different from length $L_5$ of the second outside portion 30 on the first main surface 12 side. In addition, length $L_4$ of the first outside portion 26 on the second main surface 14 side is different from length $L_6$ of the second outside portion 30 on the second main surface 14 side. Relations $L_5 > L_3$ and $L_6 > L_4$ are established among the lengths.

A glass plate according to a second embodiment will be described with reference to FIG. 3 and FIG. 4. Constituents similar to those in the glass plate according to the first embodiment will be referred by the same sign correspondingly, and description thereof may be omitted. FIG. 3 is a sectional view of the glass plate according to the second embodiment. FIG. 4 is enlarged views of end surfaces of the glass plate in FIG. 3.

As shown in FIG. 3, a glass plate 10 has a first main surface 12 and a second main surface 14, and a first end surface 16 and a second end surface 18 that are adjacent to the first main surface 12 and the second main surface 14. The glass plate 10 has a wedge shape in a sectional shape in which thickness $t_1$ on the first end surface 16 side is thinner than thickness $t_2$ on the second end surface 18 side. The glass plate according to the second embodiment is a glass plate in which a first tip portion and a second tip portion which will be described later each have curvature radius being larger than ½ of the thickness $t_1$.

(A) of FIG. 4 is an enlarged view of the first end surface. A first chamfered portion 20 in the first end surface 16 has a first tip portion 24 having a curved surface shape, first outside portions 26 connected to the first main surface 12 and the second main surface 14 and extending to the first tip portion 24, and two first transition portions 32 provided between the first tip portion 24 and the first outside portions 26 so as to connect the first tip portion 24 to the first outside portions 26 respectively. A curvature radius $r_1$ of the first tip portion 24 is larger than ½ of the thickness $t_1$. Each of the two first outside portions 26 has a flat shape or a curved surface shape. The flat shape (linear shape) is preferred. It is noted that the flat shape (linear shape) includes an arc shape which can be approximated substantially to a straight line. The arc shape which can be approximated substantially to a straight line is not particularly limited. The arc shape has a camber in the order of $1 \times 10^{-1}$ mm or less.

Differently from the first embodiment, the glass plate 10 according to the second embodiment has the first transition portions 32. The curvature radius $r_1$ of the first tip portion 24 according to the second embodiment is larger than ½ of the thickness $t_1$. Accordingly, the angle formed at the intersection between the first tip portion 24 and each first outside portion 26 approaches 90°. It is difficult to connect the first tip portion 24 to the first outside portion 26 smoothly. Therefore, the first transition portions 32 are provided so that the first tip portion 24 can be connected to the first outside portions 26 smoothly. As a result, it is excellent in productivity improvement and stability of quality. It is preferable that the curvature radius $r_1$ of the first tip portion 24 is smaller than 6.8 times of the thickness $t_1$. Each first transition portion 32 preferably has a curved surface shape, and more preferably has an arc shape with a curvature radius smaller than that of the first tip portion 24.

(B) of FIG. 4 is an enlarged view of the second end surface. A second chamfered portion 22 in the second end surface 18 has a second tip portion 28 having a curved surface shape, second outside portions 30 connected to the first main surface 12 and the second main surface 14 and extending to the second tip portion 28, and two second transition portions 34 provided between the second tip portion 28 and the second outside portions 30 so as to connect the second tip portion 28 to the second outside portions 30 respectively. A curvature radius $r_2$ of the second tip portion 28 is larger than ½ of the thickness $t_1$. Each of the two second outside portions 30 has a flat shape or a curved surface shape. The flat shape (linear shape) is preferred. It is noted that the flat shape (linear shape) includes an arc shape which can be approximated substantially to a straight line. The arc shape which can be approximated substantially to a straight line is not particularly limited. For example, the arc shape has a camber in the order of $1 \times 10^{-1}$ mm or less.

Differently from the first embodiment, the glass plate 10 according to the second embodiment has the second transition portions 34. The curvature radius $r_2$ of the second tip portion 28 according to the second embodiment is larger than ½ of the thickness $t_1$. Accordingly, the angle formed at the intersection between the second tip portion 28 and each second outside portion 30 approaches 90°. It is difficult to connect the second tip portion 28 to the second outside portion 30 smoothly. Therefore, the second transition portions 34 are provided so that the second tip portion 28 can be connected to the second outside portions 30 smoothly. Each second transition portion 34 preferably has a curved surface shape, and more preferably has an arc shape with a curvature radius smaller than that of the second tip portion 28.

Also in the second embodiment, the shape of the first tip portion 24 is the same as the shape of the second tip portion 28 in the same manner as in the first embodiment.

The phrase "the same" in the first and second embodiments includes "the same" and "substantially the same". The phrase "substantially the same" means a case of being regarded as equal on appearance. Based on the first end surface 16 side, a difference of about ±5% is allowed with respect to lengths, curvature radii, inclination angles, etc.

When the shape of the first tip portion 24 in the first chamfered portion 20 is made the same as the shape of the second tip portion 28 in the second chamfered portion 22 in the first and second embodiments, it is possible to improve the productivity and the chamfering quality in forming the chamfered portions in the glass plate 10 having a wedge shape in a sectional shape.

In the aforementioned embodiments, the sectional shape of the first chamfered portion 20 is provided so that the two first outside portions 26 are symmetric with respect to the first tip portion 24, and the sectional shape of the second chamfered portion 22 is provided so that the two second outside portions 30 are symmetric with respect to the second tip portion 28.

The present invention is not limited thereto, but the first outside portions 26 may be asymmetric with respect to the first tip portion 24 in the sectional shape of the first chamfered portion 20. In the same manner, the second outside portions 30 may be asymmetric with respect to the second tip portion 28 in the sectional shape of the second chamfered portion 22.

Next, a method of forming chamfered portions (the first chamfered portion 20 and the second chamfered portion 22) in the glass plate 10 according to the first embodiment will be described by way of example. The glass plate 10 which has a wedge shape in a sectional shape having no chamfered portion formed therein is prepared. As shown in FIG. 5, the second main surface 14 of the glass plate 10 is retained on a plurality of suction pads 70. The suction pads 70 communicate with a suction pump (not shown) through ducts disposed internally. When the suction pump is driven, the glass plate 10 is sucked and retained on the suction pads 70.

The second end surface 18 of the glass plate 10 is chamfered by a rotary grindstone 72. An annular grinding groove 74 extending in circumferential direction is formed in an outer circumferential surface of the rotary grindstone 72. Abrasive grains of alumina, silicon carbide, diamond, etc. are contained in a wall surface of the grinding groove 74. Grading (JIS-R6001) of the grain size of the abrasive grains is, for example, #120 or more and #2000 or less. The smaller the grading is, the larger the grain size is. The rotary grindstone 72 which is being rotated around a central line of the rotary grindstone 72 is moved relatively along the outer peripheral edge of the glass plate 10 so that at least the first end surface 16 and the second end surface 18 of the glass plate 10 are ground by the grinding groove 74. Thus, the second chamfered portion 22 is formed in the second end surface 18.

As shown in FIG. 5, the grinding groove 74 has a concave portion with an inverted shape corresponding to the shape of the second chamfered portion 22. The concave portion of the grinding groove 74 has a curved surface shape corresponding to the curved surface shape of the second tip portion 28, and flat shapes or curved surface shapes corresponding to the second outside portions 30.

When the second chamfered portion 22 has been completely formed in the second end surface 18, the rotary grindstone 72 is moved to the first end surface 16 of the glass plate 10 while the peripheral edge portion of the glass plate 10 is chamfered by the rotary grindstone 72.

As shown in FIG. 6, the first end surface 16 of the glass plate 10 is chamfered by the rotary grindstone 72. In the present embodiment, it is assumed that the first tip portion 24 of the first chamfered portion 20 has the same shape as the second tip portion 28 of the second chamfered portion 22. Accordingly, by the same rotary grindstone 72, the first chamfered portion 20 and the second chamfered portion 22 can be formed in the first end surface 16 and the second end surface 18 which are different in thickness in the glass plate 10 having a wedge shape in a sectional shape. A plurality of chamfering steps are not necessary to be performed by rotary grindstones corresponding to the thicknesses of the end surfaces. Thus, the chamfered portions can be formed efficiently in the end surfaces of the glass plate having a wedge shape in a sectional shape. In addition, the quality can be stabilized. A secondary finishing step such as a mirror-finishing step may be further performed on a chamfered portion thus formed. In addition, when the first outside portions 26 are made asymmetric with respect to the first tip portion 24 in the sectional shape of the first chamfered portion 20, or when the second outside portions 30 are made asymmetric with respect to the second tip portion 28 in the sectional shape of the second chamfered portion 22, processing may be performed with the rotary grindstone 72 in which the concave portion of the grinding groove 74 corresponds to the shapes to be formed. Alternatively, after processing is once performed to form symmetric shapes, additional processing may be performed to form the symmetric shapes into asymmetric shapes.

(Laminated Glass)

A laminated glass using a glass plate according to the present embodiment will be described with reference to FIG. 7. FIG. 7 is a sectional view showing an example of the laminated glass.

As shown in FIG. 7, a laminated glass 100 has two glass plates 110 and 120, and an intermediate film 130 which bonds the two glass plates 110 and 120 together. Each of the glass plates 110 and 120 used in the laminated glass 100 according to the present embodiment is a glass plate having a wedge shape in a sectional shape. The laminated glass may include two or more glass plates as long as at least one of the two or more glass plates is a glass plate having a wedge shape in a sectional shape.

A first chamfered portion 112 and a second chamfered portion 114 having the same shape in their tip portions are formed in a first end surface and a second end surface of the glass plate 110. In addition, a first chamfered portion 122 and a second chamfered portion 124 having the same shape in their tip portions are formed in a first end surface and a second end surface of the glass plate 120. The glass plate 110 and the glass plate 120 are disposed so that the first chamfered portion 112 and the second chamfered portion 114 face the first chamfered portion 122 and the second chamfered portion 124 respectively.

Polyvinylacetal-based resin is preferably used as the intermediate film 130. Although not particularly limited, polyvinylbutyral resin (PVB) is preferably used as the polyvinylacetal-based resin because the intermediate film 130 thus obtained can have an excellent balance among various capacities such as excellent transparency, weathering resistance, strength, adhesive force, penetration resistance, impact energy absorption capability, moisture resistance, heat insulation properties, sound insulation properties, etc. Such a polyvinylacetal-based resin may be used alone, or two or more kinds thereof may be used together. Incidentally, the intermediate film 130 may be a sound insulation film in which a sound insulation layer is held between skin layers.

As shown in FIG. 7, the intermediate film 130 has a sectional shape with a constant thickness. That is, in the intermediate film 130, a surface in contact with the glass plate 110 is parallel or substantially parallel to a surface in contact with the glass plate 120. The thickness of the intermediate film 130 is preferably 0.2 mm or more and 5.2 mm or less, more preferably 0.3 mm or more and 4.0 mm or less, and further more preferably 0.4 mm or more and 3.5 mm or less.

Since the intermediate film 130 has a sectional shape with a constant thickness, the thickness of an end surface (on the side close to the second chamfered portions 114 and 124 of the glass plate 110 and the glass plate 120) of the intermediate film 130 can be made thinner as compared with a case where an intermediate film having a wedge shape is used. Incidentally, it will go well if an intermediate film 130 having a wedge shape in a sectional shape is used.

A case where the laminated glass 100 according to the present embodiment shown in FIG. 7 is used in a head-up display device will be described. Display information 142 emitted from a display 140 is reflected at a point A of the glass plate 120 and imaged as a displayed image (virtual image) 144. Another display information 146 is incident on a point B of the glass plate 120, and refracted to reach a point C of the glass plate 110. A part of the display information 146 is reflected at a point C of the glass plate 110, incident on the point A of the glass plate 120, refracted and imaged as a displayed image 148. As a result, light paths of the lights reflected at the point A and the point C to reach a driver 150 coincide with each other. Therefore, the displayed image 144 and the displayed image (virtual image) 148 can be visually recognized as consistent by the driver 150. Thus, the amount of double images can be suppressed.

It is preferable that the intermediate film 130 and the glass plates 110 and 120 are arranged so as to have refractive indexes substantially equal to each other. In this manner, optical distortion can be prevented from occurring.

(Windshield)

A windshield including a laminated glass using a glass plate according to the present embodiment will be described with reference to FIG. 8. FIG. 8 is a sectional view of a main portion of the windshield.

As shown in FIG. 8, a windshield 200 has a laminated glass 100, a resin frame 202 provided in a peripheral edge portion of the laminated glass 100, and a double-sided adhesive tape 220 which bonds the resin frame 202 to the laminated glass 100.

The laminated glass 100 includes a glass plate 110 and a glass plate 120. The glass plate 110 is an outer glass plate which is positioned on an external side of a vehicle, and the glass plate 120 is an inner glass plate which is positioned on an internal side of the vehicle. The glass plate 110 and the glass plate 120 are bonded to each other through an intermediate film 130.

The resin frame 202 is constituted by a body portion 204, a flange portion 206 extended from the body portion 204 so as to support the glass plate 120 of the laminated glass 100, a lip portion 208 extended from the external side surface of the body portion 204, and a nip portion 210 brought into contact with a surface of the glass plate 110 of the glass 100 on the external side of the vehicle.

A first adhesive surface 220A of the double-sided adhesive tape 220 is bonded to the flange portion 206, and a second adhesive surface 220B of the double-sided adhesive tape 220 is bonded to the glass plate 120. Thus, the resin frame 202 is bonded to the peripheral edge portion of the laminated glass 100 through the double-sided adhesive tape 220.

The windshield 200 is fixed to a vehicle panel (not shown) in an opening portion of a car through a bonding agent (not shown). In addition, a gap between an end portion of the laminated portion 100 and the vehicle body panel is sealed up by the lip portion 208 of the resin frame 202.

An urethane bonding agent can be suitably used as the bonding agent for fixing the resin frame 202 to the opening portion. Flowing of the bonding agent is regulated by a dam rubber (not shown) made of rubber which is disposed between the vehicle body panel and the windshield 200.

The windshield 200 according to the present embodiment has a configuration including the glass plates 110 and 120 each having a wedge shape in a sectional shape. Thus, the windshield 200 can be used suitably as a windshield supporting an HUD of a car.

The present application claims priority based on Japanese Patent Application No. 2016-235219 filed on Dec. 2, 2016, the entire contents of which are invoked herein.

REFERENCE SIGNS LIST

10 . . . glass plate, 12 . . . first main surface, 14 . . . second main surface, 16 . . . first end surface, 18 . . . second end surface, 20 . . . first chamfered portion, 22 . . . second chamfered portion, 24 . . . first tip portion, 26 . . . first outside portion, 28 . . . second tip portion, 30 . . . second outside portion, 32 . . . first transition portion, 34 . . . second transition portion, 70 . . . suction pad, 72 . . . rotary grindstone, 74 . . . grinding groove, 100 . . . laminated glass, 110 . . . glass plate, 112 . . . first chamfered portion, 114 . . . second chamfered portion, 120 . . . glass plate, 122 . . . first chamfered portion, 124 . . . second chamfered portion, 130 . . . intermediate film, 140 . . . display, 142 . . . display information, 144 . . . displayed image, 146 . . . display information, 148 . . . displayed image, 150 . . . driver, 200 . . . windshield, 202 . . . resin frame, 204 . . . body portion, 206 . . . flange portion, 208 . . . lip portion, 210 . . . nip portion, 220 . . . double-sided adhesive tape, 220A . . . first adhesive surface, 220B . . . second adhesive surface

The invention claimed is:

1. A glass plate, comprising:
a wedge shape glass plate having a first main surface, a second main surface on an opposite side with respect to the first main surface, a first end surface at a first end of the first and second main surfaces, and a second end surface at a second end of the first and second main surfaces on an opposite end with respect to the first end such that the wedge shape glass plate has a thickness on a first end surface side that is thinner than a thickness on a second end surface side,
wherein the first end surface has a first chamfered portion including a first tip portion having a curved surface shape, the second end surface has a second chamfered portion including a second tip portion having the curved surface shape such that the curved surface shape of the second tip portion is formed to have the curved surface shape of the first tip portion.

2. The glass plate according to claim 1, wherein the curved surface shape of each of the first and second tip portions has an arc shape having a curvature radius that is not larger than ½ of the thickness on the first end surface side.

3. The glass plate according to claim 2, wherein the first chamfered portion includes first outside portions each having a flat shape or a curved surface shape between the first tip portion and each of the first main surface and the second main surface, and the second chamfered portion includes second outside portions each having a flat shape or a curved surface shape between the second tip portion and each of the first main surface and the second main surface.

4. The glass plate according to claim 1, wherein the curved surface shape of each of the first and second tip portions has an arc shape having a curvature radius that is larger than ½ of the thickness on the first end surface side.

5. The glass plate according to claim 4, wherein the first chamfered portion includes first outside portions each having a flat shape or a curved surface shape between the first tip portion and each of the first main surface and the second main surface, and the second chamfered portion includes second outside portions each having a flat shape or a curved surface shape between the second tip portion and each of the first main surface and the second main surface.

6. The glass plate according to claim 5, wherein the first end surface includes first transition portions between the first tip portion and the first outside portions respectively such that each of the first transition portions has a curved surface shape, and the second end surface includes second transition portions between the second tip portion and the second outside portions respectively such that each of the second transition portions has a curved surface shape.

7. The glass plate according to claim 3, wherein each of the second outside portions has a length larger than a length of each of the first outside portions.

8. The glass plate according to claim 7, wherein the first outside portions and the second outside portions have inclination angles that are equal to each other with respect to the first main surface and the second main surface.

9. The glass plate according to claim 1, wherein the thickness on the first end surface side is 0.5 mm or more and 2.35 mm or less, and the thickness on the second end surface side is 0.6 mm or more and 3.35 mm or less.

10. The glass plate according to claim 1, wherein the wedge shape glass plate has a wedge angle of 0.1 mrad or more and 0.7 mrad or less.

11. A laminated glass, comprising:
a plurality of glass plates; and
at least one intermediate film bonding the glass plates,
wherein at least one of the glass plates is the glass plate of claim 1.

12. The laminated glass according to claim 11, wherein the intermediate film has a constant thickness.

13. A windshield, comprising:
the laminated glass of claim 12; and
a resin frame attached to a peripheral edge portion of the laminated glass.

14. The glass plate according to claim 1, wherein the thickness on the first end surface side is 0.5 mm or more and 2.35 mm or less, the thickness on the second end surface side is 0.6 mm or more and 3.35 mm or less, and the wedge shape glass plate has a wedge angle of 0.1 mrad or more and 0.7 mrad or less.

15. The glass plate according to claim 1, wherein the thickness on the first end surface side is 1.0 mm or more and 2.3 mm or less, and the thickness on the second end surface side is 1.1 mm or more and 3.3 mm or less.

16. The glass plate according to claim 1, wherein the wedge shape glass plate has a wedge angle of 0.2 mrad or more and 0.6 mrad or less.

17. The glass plate according to claim 2, wherein the thickness on the first end surface side is 0.5 mm or more and 2.35 mm or less, and the thickness on the second end surface side is 0.6 mm or more and 3.35 mm or less.

18. The glass plate according to claim 2, wherein the wedge shape glass plate has a wedge angle of 0.1 mrad or more and 0.7 mrad or less.

19. The glass plate according to claim 4, wherein the thickness on the first end surface side is 0.5 mm or more and 2.35 mm or less, and the thickness on the second end surface side is 0.6 mm or more and 3.35 mm or less.

20. The glass plate according to claim 4, wherein the wedge shape glass plate has a wedge angle of 0.1 mrad or more and 0.7 mrad or less.

\* \* \* \* \*